United States Patent
Shaffer et al.

(10) Patent No.: US 8,429,124 B2
(45) Date of Patent: Apr. 23, 2013

(54) ON DEMAND MULTI-LOCATION LARGE DATABASE SYNCHRONIZATION SYSTEM

(75) Inventors: James D. Shaffer, Rancho Santa Fe, CA (US); Alex Oliveira, San Diego, CA (US)

(73) Assignee: Neustar Information Services, Inc., Sterling, VA (US)

( * ) Notice: Subject to any disclaimer, the term of this patent is extended or adjusted under 35 U.S.C. 154(b) by 147 days.

(21) Appl. No.: 12/975,012

(22) Filed: Dec. 21, 2010

(65) Prior Publication Data
US 2012/0158653 A1  Jun. 21, 2012

(51) Int. Cl.
G06F 7/00  (2006.01)
G06F 17/00  (2006.01)

(52) U.S. Cl.
USPC .......................................... 707/622; 707/638

(58) Field of Classification Search .................. None
See application file for complete search history.

(56) References Cited

U.S. PATENT DOCUMENTS

| | | | |
|---|---|---|---|
| 7,991,742 B2 * | 8/2011 | Li et al. | 707/638 |
| 8,112,460 B2 * | 2/2012 | Arthursson et al. | 707/810 |
| 8,126,859 B2 * | 2/2012 | Rath et al. | 707/695 |
| 8,200,623 B2 * | 6/2012 | Liu et al. | 707/610 |
| 2003/0131025 A1 * | 7/2003 | Zondervan et al. | 707/200 |

* cited by examiner

*Primary Examiner* — Hosain Alam
*Assistant Examiner* — Azam Cheema
(74) *Attorney, Agent, or Firm* — Procopio, Cory, Hargreaves & Savitch LLC

(57) ABSTRACT

Systems and method for distributing updates on demand to synchronize a remote client database with a source database are provided. A client can request an online update from the database content provider and the database provider can stream database updates to the client over a network connection in real time, or the database content provider can stream database updates to the client at scheduled times based on a licensing agreement with the client. This allows the client database to be kept in synch with the source database without requiring that the database provider generate a set of database updates on physical media and ship the physical media to the client for processing.

20 Claims, 8 Drawing Sheets

ON DEMAND MULTI-LOCATION LARGE DATABASE SYNCHRONIZATION SYSTEM

FIELD OF THE INVENTION

This invention relates to database systems and to systems and methods for updating multiple version of a large database on demand.

BACKGROUND

With the advent of computers, databases have become a ubiquitous feature of businesses throughout the world. Data has become a crucial commodity, and database information providers can sell a database or subsets of a database to customers who can utilize the information included in the database to operate their businesses. The size of compiled databases has grown significantly. Some compiled databases contain millions of records (rows) and hundreds of attribute (columns), and many of these databases are licensed to clients that are located across a wide geographical area.

The problem of how to keep all these database copies current is a significant problem. This problem is compounded with different licensees wanting only selected rows of data (i.e. only California records) and/or selected columns of data in their copy of the database. The desired licensee frequency of database synchronization requirements varies from every few days to once a year. The problem becomes more acute with increases in the number of licensees, the addition of new attributes (more columns), the frequency of updates to the master database and the desire of the licensees to keep their database copy as current as possible.

Third party clients can purchase a license for a copy of the database, and the clients can contract with the database provider to receive periodic updates to the contents of the database. Keeping all of these remote copies of the database updated can present a significant problem. This problem is compounded when different licensees receive only a selected subset of the data included in the database. Some clients may only be licensed to receive select rows or select columns of a database. For example, one licensee may contract to receive only records that include California data, while another licensee may contract to receive data from multiple states but only receive a subset of the columns included in the full source database. The frequency at which licensees desire to receive updates to synchronize their copies of the database with the database provider's source database can also vary greatly, some licensees may require daily updates or updates every few days, while others might only require yearly updates.

Keeping all of these remote licensed copies of the source database updated becomes increasingly difficult as the number of licensees increases, the number of new attributes (columns) included in the database increase, the frequency of updates to the master database (also referred to herein as the source database), and the number of licensees requiring more frequent updates increases. In a conventional system, database copies were shipped to licensees on tangible computer-readable media at periodic intervals. For example, copies of the database could be shipped on magnetic media, such as magnetic tape or disks, or optical media, such as CD-ROM or DVD-ROM. The licensee was then responsible for installing the updated copy of the database received from the database provider.

Generating and shipping copies of the database on physical media can become an arduous, time-consuming, and expensive process to generate a custom copy of a database for each licensee at each update cycle. Some database providers began offering delta files (also referred to as change files) that include only changes that have been made to the source database since the last version of the database was shipped. However, the database provider must still generate numerous different permutations of the deltas that are customized to needs of each of the licensees.

As an alternative solution, some database providers have used encrypted keys for each column of the database rather than generating deltas specific for each licensee. Each licensee is provided with the keys to unlock those columns to which the licensee is allowed to access. However, this solution does not solve all of the problems associated with generating database updates for a large number of licenses and the encryption techniques used do not meet the security requirements of many of the database providers. If the encryption is broken, the contents of the entire source database can be accessed by unauthorized parties.

Yet another alternative solution for providing database updates to licensees is illustrated in FIG. 1. In these embodiments, a data file that includes the changes to the database is constructed by a source content server and provided to a file transfer protocol (FTP) server (step 910). The FTP server can then compress the file (step 920). A licensee can then download the compressed file from the FTP server to an onsite file server (step 930) across the Internet or other network connection. The file server can then be used to decompress the file that was downloaded (step 940), and the downloaded file can be ingested by a customer content hosting server that can use the information in the file to update a database (step 950).

As the size and complexity of the compiled databases continues to grow, the ability to provide updates to the database can become increasingly burdensome both for the database provider and the clients. As a result, database updates may only be issued periodically, which can result in the client databases being out of date until the next update is issued. Furthermore, because the onus of installing the database updates at the client's site falls on the client, the database provider cannot be sure that the clients are actually making the updates to their copies of the database using the updates provided by the client. Also, there is a chance that a client could accidentally skip installation of a delta, and due to the incremental nature of such updates, cause damage to the client database. Often, the client databases become out of synch with the source database, due the various factors described above.

SUMMARY

Systems and method for distributing updates on demand to synchronize a remote client database with a source database are provided. A client can request an online update from the database content provider and the database provider can stream database updates to the client over a network connection in real time, or the database content provider can stream database updates to the client at scheduled times based on a licensing agreement with the client. This allows the client database to be kept in synch with the source database without requiring that the database provider generate a set of database updates on physical media and ship the physical media to the client for processing.

According to an embodiment, a computer-implemented method for synchronizing the contents of a remote database with a source database is provided, where one or more processors are programmed to perform the steps of the method. The steps include receiving a request from a content hosting server for an update to a remote database associated with the content hosting server, identifying a database version associated with the remote database, identifying data entries from the source database to be included in a database update based on the database version associated with the remote database, generating a data stream that includes the identified data entries, and transmitting the data stream to the content hosting server.

According to another embodiment, a computer-implemented method for synchronizing the contents of a local database with a remote source database is provided, where one or more processors are programmed to perform the steps of the method. The steps include sending a request for an update to a local database to a database server via a network connection, receiving a data stream from the database server that includes updates to the local database; extracting data from the data stream, generating database commands based on the data extracted from the data stream, and executing the database commands to update the local database.

According to another embodiment, a technical system for synchronizing the contents of a remote database with a source database is provided. The system includes a non-transitory computer readable medium configured to store computer executable programmed modules. The system also includes a processor communicatively coupled with the non-transitory computer readable medium configured to execute programmed modules stored therein. The system also includes a download management module stored in the non-transitory computer readable medium and configured to receive a request from a content hosting server to update a remote copy of a database and to determine whether the content hosting server is eligible to receive an update to the remote database. The system also includes a version management module stored in the non-transitory computer readable medium and configured to identify a version of the remote database associated with the content hosting server, to determine whether an update is available based on a high water mark revision number associated with the source database, and to identify data entries from the source database to be included in a database update based on the high water mark revision number associated with the remote database. The system also includes a data conversion module stored in the non-transitory computer readable medium and configured to generate a data stream that includes the identified data entries from the source database and to send the data stream to the content hosting server, wherein the content hosting server is configured to receive the data stream and to convert the data stream into database commands to update the remote database.

According to another embodiment, a technical system for synchronizing the contents of a local database with a remote source database is provided. The system includes a non-transitory computer readable medium configured to store computer executable programmed modules, and a processor communicatively coupled with the non-transitory computer readable medium configured to execute programmed modules stored in the non-transitory computer readable medium. The system also includes a browser module stored in the non-transitory computer readable medium and configured to send a request to a database server for an update to contents of the local database. The system also includes a data management module stored in the non-transitory computer readable medium and configured to access data stored in and to write data to the local database. The system also includes a data update module stored in the non-transitory computer readable medium and configured to: receive a data stream comprising database updates for the local database from the database server via a network connection, extract data from the data stream, generate database commands based on the data extracted from the data stream, and execute the database commands to update the contents of the local database in order to synchronize the contents of the local database with contents of the source database of the database server.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

The systems and methods disclosed herein provide techniques for synchronizing large databases located at remote locations with a large source database maintained by a database provider. Clients can send a request to update the content of their database on demand, the database provider can determine what version of the database that the client has, generate a set of updates for the client's database if the client's database is out of date and stream the updates to the client over a network connection. As a result, a client no longer has to wait for periodic updates to the database content to be generated by the database provider and shipped to the client on tangible computer-readable media.

The systems and methods disclosed herein can also prevent a client's version of the database from being damaged or destroyed by incorrectly applying an update received from the database provider. For example, one conventional approach for providing database updates is to provide a set of delta files that comprise a set of commands to be executed on the database to update, add, or delete data and/or restructure the database. Typically, these deltas are cumulative and need to be applied in the correct order for the database to be updated correctly. If a client fails to apply a delta to their database and then attempts to apply a subsequent delta to the database, it is possible that the client's database could be damaged. The systems and methods disclosed herein avoid this problem by keeping track of which version of the database each client has and selecting a set of updates to be streamed to the client that are required to update the version of the database that the client is currently using.

The systems and method disclosed herein also provide for secure transfers of database data over a public network, such as the Internet. The database server can send a stream of encrypted data to a content hosting server to prevent the database contents from being intercepted by third parties. Compression techniques can also be used to provide for faster transfer of the database contents over the network. According to an embodiment, the content hosting server can comprise one or more computer systems implemented using hardware, software, or a combination thereof.

Figure 2:
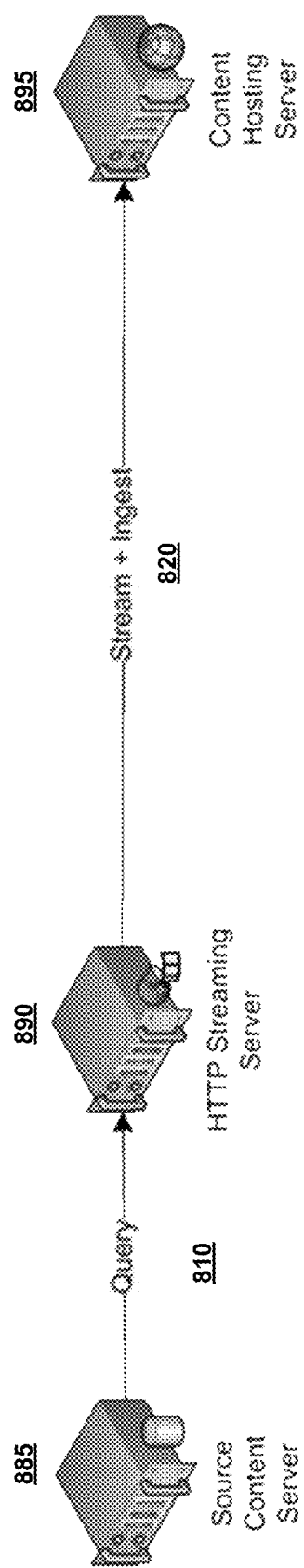
FIG. 2 is a high level block diagram illustrating an improved approach for synchronizing a large remote database to a source database according to an embodiment.

FIG. 2 is a high level block diagram illustrating an improved approach for synchronizing a large remote database to a source database according to an embodiment. FIG. 2 illustrates a streaming model where database server content is provided to a streaming server 890 by a source content server 895 in response to a query for content to be included in the database update (step 810) and the streaming server 890 streams the database server content directly to a client's remote content hosting server 895 (step 820) where the streamed content is ingested by the remote content hosting server 895 and used to update the contents of the client database. This streaming model simplifies the data transfer process when synchronizing the contents of a large remote database to a source database. According to an embodiment, the remote content hosting server 895 and the streaming server 890 can comprise one or more computer systems implemented using hardware, software, or a combination thereof According to an embodiment, the remote content hosting server 895 and the streaming server 890 can be implemented on the same computer system or same set of computer systems.

According to an embodiment, the streaming server 890 can be configured to compress and/or encrypt physical or logical blocks in the data stream, and the content hosting server 895 can be configured to decompress and/or decrypt the data stream. These techniques can reduce the amount of data being transferred as well as make the data in transit more secure. According to an embodiment, various compression and/or encryption techniques can be implemented by streaming server 890.

Figure 1:
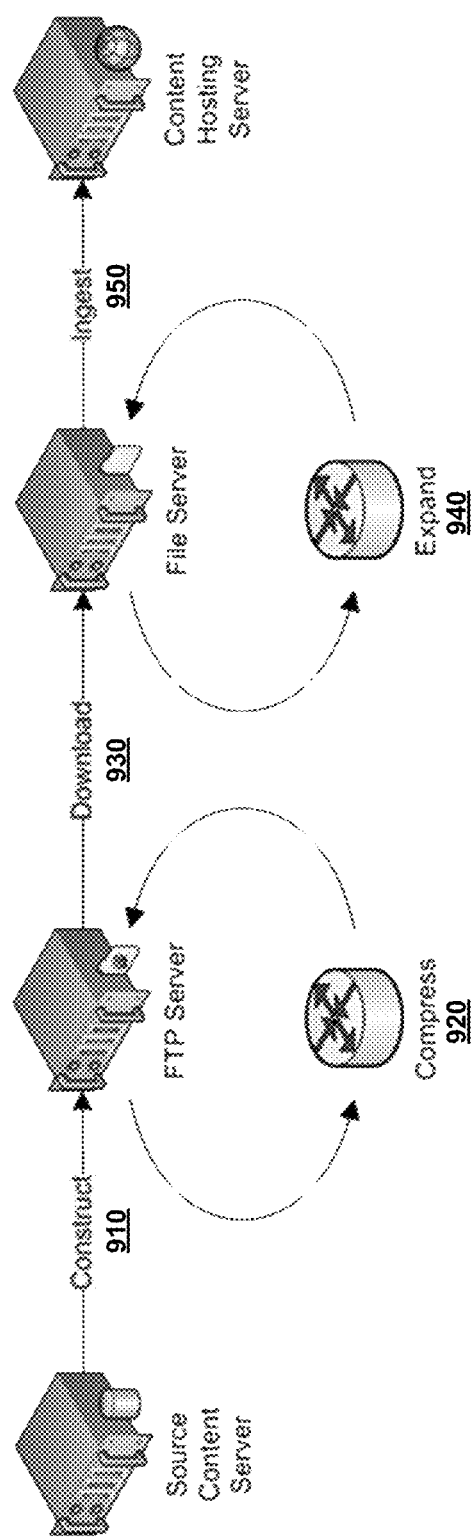
FIG. 1 is a high level block diagram illustrating a conventional approach to synchronizing a large remote database to a source database.

The traditional data transfer model illustrated in FIG. 1 is a serial model where each step cannot begin until the previous step has ended. While it is possible that the individual steps involved in the download model may be faster in the steps involved in the streaming model disclosed herein, the overall speed of the streaming model illustrated in FIG. 2 can be significantly faster than the traditional transfer model.

The following example illustrates estimated completion times for performing a database update on a remote database using the traditional data transfer model versus the streaming model disclosed herein to illustrate how the streaming model can complete the update process much faster than the traditional model. The following are estimated completion times for using the traditional transfer model to perform the update: (1) construct file—2 hours; (2) compress file—1 hour; (3) download file to client file server—3 hours; (4) expand/uncompress the data file—1 hour; and (5) ingest the update file at the database server—2 hours. The total estimated time to complete the update if the steps of the traditional transfer model are performed sequentially is approximately 9 hours. In contrast, if the streaming model were used to complete the same update, the time can be significantly reduced: (1) execute query—0 hours (a query is executed on the master database to determine which records to include this step is described below); (2) stream the collected data to client's content housing server and client's server ingests the streamed content—6 hours. The total estimated time to complete the update if the streaming model is used is approximately 6 hours. The first record in the traditional transfer model is not ingested until the $8^{th}$ hour of the process, while in the streaming model disclosed herein, the first record is almost immediately ingested by the client's content housing server.

Revision-Based Change Management

According to an embodiment, the stream-based model disclosed herein can be incorporated into a database synchronization system that implements revision-based change management. According to an embodiment, revision-based change management can use a universal change counter. The universal change counter can be applied in a hierarchical rollup pattern that allows for both micro and macro change management. Each version of the database can be associated with a revision number that indicates which records and fields of records have been modified in a particular revision of the database content.

Figure 8:
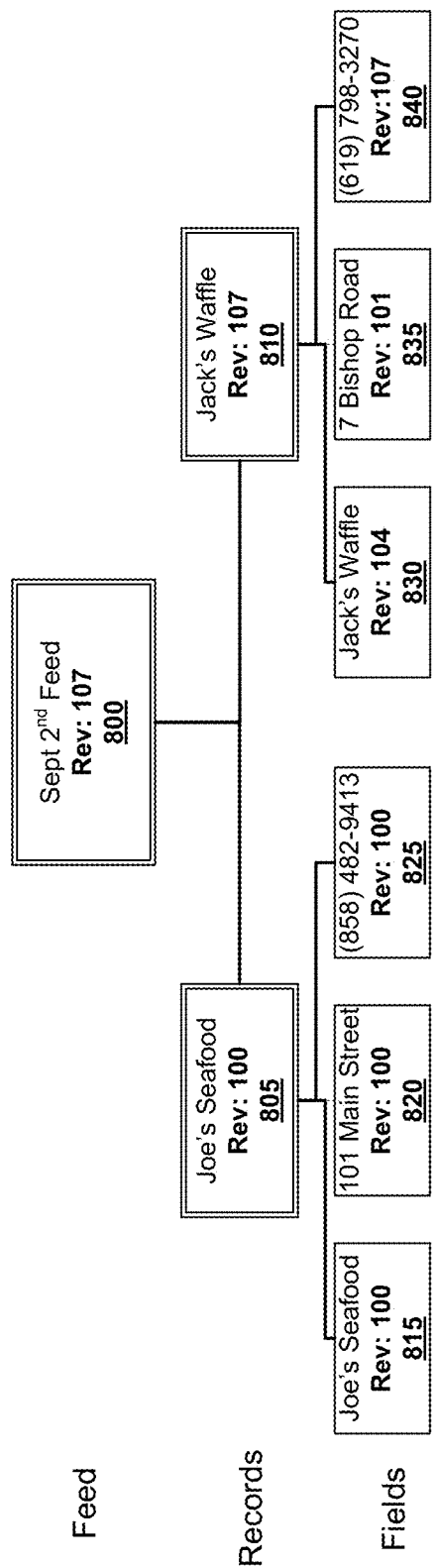
FIG. 8 is a block diagram illustrating the hierarchical structure of a feed according to an embodiment.

FIG. 8 is a block diagram illustrating the hierarchical structure of a feed according to an embodiment. FIG. 8 illustrates an example of a universal change counter being applied to a set of data to be included in a feed. Each field is tagged with a sequence change number. For example, at the top of the hierarch is the feed 800, which has a revision number of 107 associated with the feed. A feed includes one or more records, and each record includes one or more fields. For example, in the embodiment illustrated in FIG. 8, the feed includes two records 805 and 810. Record 805 includes three fields 815, 820, and 825, and record 810 includes three fields 830, 835, and 840. The embodiment illustrated in FIG. 8 only includes a few records with a small number of fields for the sake of clarity. The number of records that can be included in a feed can vary as can the number of fields associated with each record.

A record inherits the highest revision number associated with its fields. For example, Record 805 has inherited the revision number 100, because each of the fields 815, 820, and 825 associated with record 805 has revision number 100. Record 810 has inherited the revision number 107. Field 830 has revision number 104, field 835 has revision number 101, and field 840 has revision number 107. Record 810 has inherited revision number 107 which is the highest revision number associated with any of the fields of record 810.

A feed also inherits the highest revision number of all of its records. For example, feed 800 has inherited revision number 107 from record 810. This hierarchical approach can be scaled or simplified to fit other database architectures, so long as a single universal revision counter is used across all of the source data subject to change management oversight. In an embodiment, a revision hierarchy could be recursively applied below the field level to include sub-components. For example, the fields 820 and 835, which contain address information, could be further broken down into subcomponents, such as street address, state, country, postal code, and/or other fields related to address information. In another embodiment, a revision hierarch could be expanded to manage multiple feeds.

According to an embodiment, a feed can be organized such that data is streamed out according to revision number. For example, when creating a new remote database for a client the data can be streamed in order by revision number. At the client end, the client's content hosting server can ingest the stream in order and keep a persistent record of the highest revision number that has been processed. If the stream is interrupted, the persistent high watermark revision information can be used to continue the update from the point of interruption. Once an initial load of the database contents is ingested by the client's content hosting server, the high water mark revision number associated with the data ingested can be used to render real-time incremental data streams that can be used to update the contents of the client's database maintained by the client's content hosting server. According to an embodiment, the database content provider's streaming server can be configured to support an updates schedule required by the client. For example, the streaming server can be configured to provide scheduled updates for a client, such as hourly, daily, weekly, or monthly updates. In an embodiment, the database content provider's streaming server can be configured to stream updates based on event triggers. For example, in an embodiment, a client can send an update request message from the client's content hosting server to the streaming server requesting an on-demand update. This request message can include the current high water mark revision number associated with the current contents of the client's database, which the streaming server can use to determine whether any revisions to the source database are available that have a higher revision number than the high water mark revision number associated with the current contents of the client's database.

Figure 9:
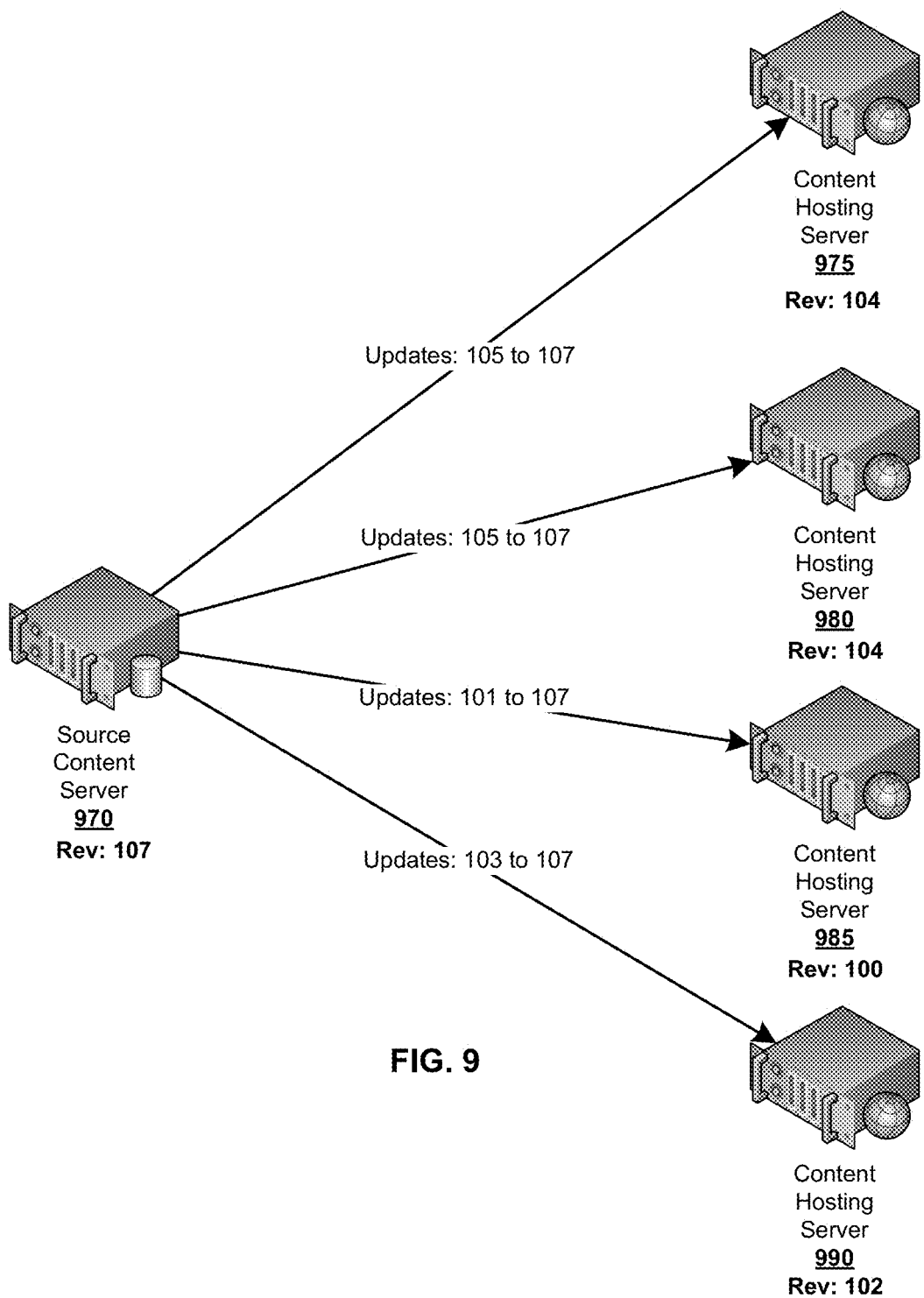
FIG. 9 is a high-level block diagram of a database synchronization system that can be used to implement the various embodiments illustrated in FIGS. 2-8.

FIG. 9 illustrates an embodiment of a database synchronization system where a database content provider's source content server 970 is configured to stream database updates to client content hosting servers 975, 980, 985, and 990 across a network. The content hosting servers 975, 980, 985, and 990 are each associated with a client licensee that has licensed a copy of a source database.

In the embodiment illustrated in FIG. 9, the source content server 970 is configured to perform the functions of both the source content server 885 and the streaming server 890 illustrated in the embodiment illustrated in FIG. 2. As described above, two separate servers can be used to perform these functions as described with respect to FIG. 2 or a single server can be used to implement these features as illustrated in FIG. 9.

Source content server 970 currently has a source database that has a high water mark revision number 107. The source content server 970 can be configured to determine the high watermark revision number associated with each client's content database and to query the source database for records to be included in the database updates to be streamed to the client. In an embodiment, the data stream comprises markup language representations of the contents of the records to be updated. In an embodiment, the data stream comprises Extensible Markup Language (XML) data.

Content hosting server 975 has a client database that is on revision 104 prior to receiving the streaming update from the source content server 970. The source content server 970 can determine based on the high water mark revision number associated with the client database which update data should be streamed to content hosting server 975 in order to bring the client database up to the current revision number of the source database. The source content server 970 includes updates related to revisions 105 through 107 in the data streamed to content hosting server 975.

Content hosting server 980 has a client database that is on revision 104 prior to receiving the streaming update from the source content server 970. The source content server 970 includes updates related to revisions 105 through 107 in the data streamed to content hosting server 975.

Content hosting server 985 has a client database that is on revision 100 prior to receiving the streaming update from the source content server 970. The source content server 970 includes updates related to revisions 101 through 107 in the data streamed to content hosting server 975.

Content hosting server 990 has a client database that is on revision 102 prior to receiving the streaming update from the source content server 970. The source content server 970 includes updates related to revisions 103 through 107 in the data streamed to content hosting server 975.

Negative Content

Embodiments of the database synchronization systems and methods disclosed here can also be configured to handle updates for negative content. Positive content is content that has been added to the source database of the content hosting server. For example, a set of data for all fourteen million active businesses in the United States is an example of positive content. In contrast, negative content is data to be removed from the source database. For example, if a business closes, the records associated with the closed business can be deleted from the database of active businesses described in the previous example.

If the content hosting server is single-sourced, e.g. uses a single content database as a source for content to be streamed to clients, then removal of the data is trivial if the content hosting server periodically performs a full replacement on the content in the client's database, because the content hosting server will request a full copy of the current revision of the source database to be streamed from the source content server.

However, in some embodiments, the client's content hosting server can be multiple-sourced where the content hosting server merges data content from multiple source databases. For example, in some embodiments, the content hosting server can append third-party content to the data acquired from the source content server. This third-party content must often persist across multiple update cycles, and can create a problem where the client's content hosting server is not synchronized with the source database of the source content server.

The revision change management techniques described herein allow negative content to be managed on the source content server in order to be streamed to remote content hosting servers. According to an embodiment, when a record or a field in the source content database is deleted, a persistent delete record is stored that includes a revision number associated with the field or record that was deleted. Thus, the order of changes to the source database is captured in the revisions. The incremental streams of records included in an update data stream are rendered in order of revision number. This allows the client's content hosting server to process the stream in the order that revisions were made to the database, and the content hosting server ingests both positive and negative content included in the data stream. Deletions are included in this data stream, allowing the content hosting server to make the appropriate deletions to the client's remote copy of the source database.

Dynamic Content

According to an embodiment, the streaming model allows for custom dynamic content to be rendered in real-time on a per-client basis. The source content server can restrict which columns and rows are available to a client based on the current licensing agreement that the database content provider has with that client. Filters can be implemented to prevent records from being requested from the source database that will end up being skipped by the client's content hosting server because they are not included in the client database to be updated. In some embodiments, the source content server can implement filters that identify records that are relevant to a particular client and only those records will be requested from the source database. In other embodiments, the client's content hosting server can be configured to include a filter that allows the content hosting server to only request records that will be ingested and not request records that would have been skipped had they been received.

Example System Implementation

Figure 3:
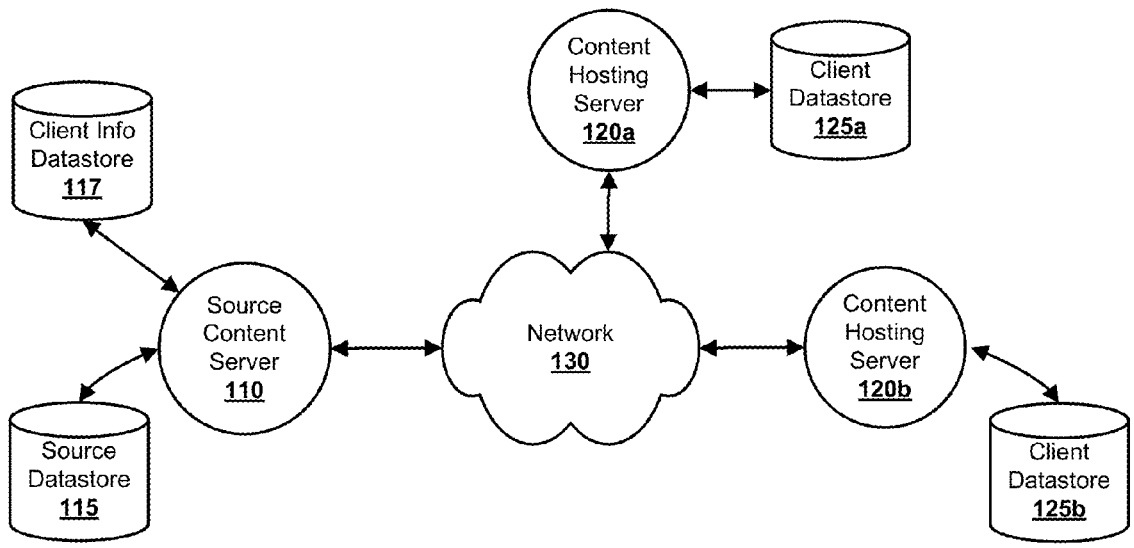
FIG. 3 is a high-level network diagram illustrating an example of a database synchronization system according to an embodiment.

FIG. 3 is a high-level network diagram illustrating an example of a database synchronization system according to an embodiment. A database provider can provide one or more databases to a plurality of clients. Each client can license the entire contents of a database or a portion thereof. The database synchronization system can be configured to provide on-demand database updates to the clients via a network connection. Database updates can be streamed across the network to content hosting servers, eliminating the need to generate database deltas on physical media and to ship the media to the client to execute the update unlike some conventional systems that still ship updates on physical media. The database synchronization system illustrated in FIG. 3 also eliminates the need to compress database updates at the database source provider, the need to transfer the compressed file to a client file server, and the need to decompress the compressed file in order for the client's content housing server to ingest the database updates, such as in the embodiment illustrated in FIG. 1.

The database synchronization system includes a source content server 110. According to an embodiment, the source content server 110 can be configured to perform the functions of the source content server 885 and the streaming server 890 illustrated in FIG. 2. In other embodiments, the functions of the source content server 110 can be implementing using more than one server. For example, in some embodiments, a separate source content server and a separate streaming server can be included in the database synchronization system.

Source content server 110 is either directly or indirectly connected to a source datastore 115. Source datastore 115 comprises a structured set of data for one or more databases that the database provider can provide to one or more clients. Source content server 110 can be implemented as a single computer system or as a plurality of servers logically arranged. Source datastore 115 can comprise one or more databases of which copies can be purchased by clients. In some embodiments, different clients can purchase copies of different versions of a database. For example, a first client might purchase a license for a full copy of a database, while a second client might purchase a license for a copy of a database that includes a subset of the data from the full source database.

Content hosting servers 120a and 120b can be client computer systems that are configured to communicate with the source content server 110 via the network 130. The content hosting servers 120a and 120b can be content hosting servers of licensees of the database content provider. The content hosting servers correspond to the content hosting server 895 illustrated in FIG. 2. According to an embodiment, the network 130 can be a series of one or more interconnected networks. In an embodiment, network 130 can be the Internet.

Content hosting servers 120a and 120b can be associated with a client of the database provider. A content hosting server, such as content hosting servers 120a and 120b are referred to herein as content server 120 throughout the detailed description. Each client may contract with the database provider to provide all of the content from the source datastore 115 or a subset of the data. Each client can maintain a local copy of the database in a client datastore 125a/125b associated with the content hosting server. According to an embodiment, client datastore 125a can be implemented on the content hosting server 120a or implemented on a separate computer system, such as a database server, that is either directly or indirectly connected to the content hosting server 120a. Similarly, client datastore 125b can be implemented on the content hosting server 120b or implemented on a separate computer system, such as a database server, that is either directly or indirectly connected to the content hosting server 120b.

In an embodiment, the one or more clients may receive all of the data included in the database or a subset of the data included in the database. Each of the one or more clients maintains a local database in their own client datastore 125a and client datastore 125b. A user of the content hosting servers 120 can request an update to one or more databases stored in their respective client datastores 125. As described above, in some embodiments, some client datastores may append data from a third party data source other than the source content serve 110 into the client datastore 125.

Figure 4:
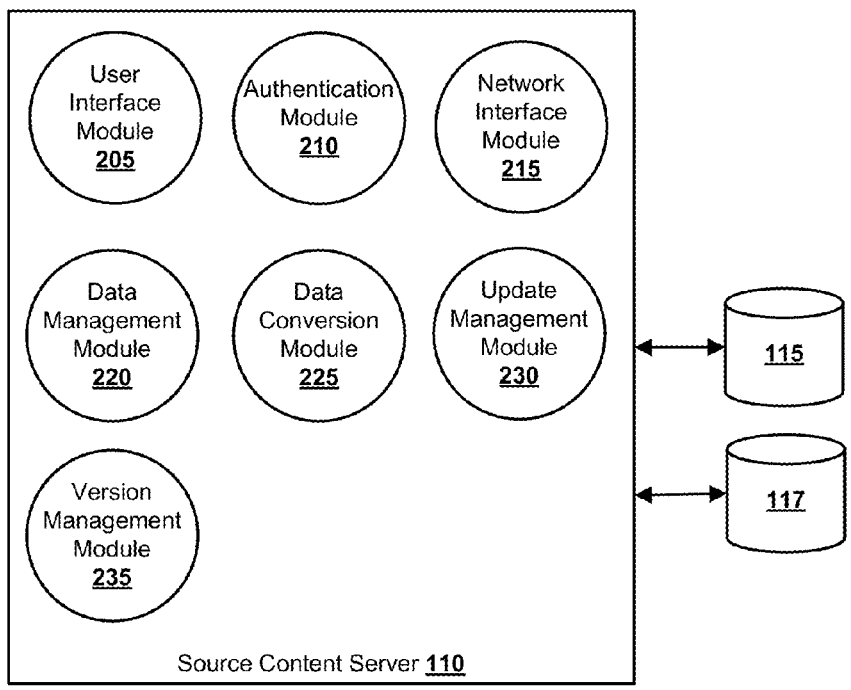
FIG. 4 is a block diagram illustrating selected functional elements of a database server according to an embodiment.

FIG. 4 is a block diagram illustrating selected functional elements of a source content server 110 illustrated in FIG. 3 according to an embodiment. Source content server 110 includes a user interface module 205, an authentication module 210, network interface module 215, data management module 220, data conversion module 225, update management module 230, and version management module 235.

User interface module 205 is configured to provide a user interface with which clients can interact with the source content server 110. According to an embodiment, the user interface module 205 can generate a user interface that comprises a set of web pages that can be displayed by a web browser application being executed on a content hosting server 120 (e.g., content hosting server 120a and/or content hosting server 120b illustrated in FIG. 3). According to an embodiment, the user interface module 205 can provide a client login interface that allows a user to provide login credentials, such as a username and password, that can be used to authenticate the client before the client is allowed to access other content on the database synchronization system. In an embodiment, the user interface module 205 can be configured to generate a "database update" user interface that allows a client to select from a set of one or more databases that the client has purchased from the database provider and to select a database from the list for which the client wishes to receive updated content.

Authentication module 210 can be configured to receive login credentials collected by the user interface module 205 and to compare the login credential received with login credentials associated with the client. In an embodiment, the user interface module 205 can provide login credentials received from a client and the authentication module 210 can authenticate the credentials by accessing the data store 125 to retrieve user information associated with the username provided and compare the password or pin provided by the user to the password stored in client information data store 117 In an embodiment, the authentication module 210 can access the client information data store 117 and/or source data store 115 via the data management module 220.

According to an embodiment, a user at the client hosting server 120 or other computer system can access a Uniform Resource Locator (URL) of the source content server 110, which can be configured as a web server. The URL can include several parameters that can be parsed by the authentication module 210 to control authentication and streaming options. An example of such a URL is:
http://webapp.contentprovider.com/publish/
stream.aspx?username=<USER>&password=
<PWD>&key=<KEY>&licenseid=<LIC>&disposition-
type=<TYPE>&serviceId=<SERVICEID>

The URL includes a username parameter and a password parameter that can be assigned to an administrator of the client's content hosting server. In some embodiments, the administrator can select their own username and password combination. The "service id" parameter is a unique identifier assigned to a client by the database content provider. This service id can be stored in the client information data store 117 along with the username and password combination for authenticating a client. The service id can be associated with client scheduling requirement (i.e., how often the client requires updates to the database) and other client-specific information, such as the current high water mark revision number associated with each of the client's licensed database. The "license id" parameter is associated with a particular database that the client has licensed from the database content provider. A client can license multiple databases from a database content provider and the database content provider can assign a separate license id to the client for each of the licensed databases.

The "disposition-type" parameter can be used to specify how the client would like to receive the streaming content. In one embodiment, an "inline" parameter value indicates that the client would like to receive the content streamed directly to the browser which can be configured, for example through a plug-in module, to process the stream of data so that the data can be ingested by the content hosting server 120 to update the contents of the client datastore 125. In an embodiment, an "attachment" parameter value indicates that the client would like to have the updates streamed to a file which can then be ingested by the content hosting server 120.

Network interface module 215 is configured to send and/or receive data across network 130. The network interface module 215 can receive information and requests from content hosting servers and forward the information or requests received to the appropriate module of the source content server 110 for processing. The network interface module 215 can be configured to format the data received from the network 130 into a format that is expected by a module of source content server 110 that is to receive the data. In an embodiment, network interface module 215 can be configured to format data received from other modules of the source content server 110 for transmission across the network 130.

Data management module 220 can be configured to provide an interface to source content server 110 for retrieving data from and storing data to datastores, such as source datastore 115 and client information data store 117. The data management module 220 can receive requests to access data from or store data to client information data store 117 and source datastore 115 or other data stores from the other modules of source content server 110. The data management module 220 can format the requests into a format that can be understood by the databases or data stores. For example, if source datastore 115 and/or client info datastore 117 are relational databases, data management module 220 can convert a request received from a module of source content server 110 to a query compatible with those database, such as a Structured Query Language ("SQL") query. The data management module 220 can also receive data from the client data store 125 or other data store and convert the data to a format expected by the module requesting the data.

Data conversion module 225 can be configured to receive database content from the source datastore 115 and to convert the database content to a format to be transmitted to a content hosting server 120. For example, in some embodiments, the database contents can be converted to Extensible Markup Language (XML) data and transmitted to the content hosting server 120 via the network 130. In an embodiment, the data conversion module 225 can be configured to stream the XML data to the content hosting server 120 over the network 130 in real time as the XML data is generated.

According to an embodiment, data conversion module 225 can be configured to compress and/or encrypt physical or logical blocks in the data stream, and the content hosting server receiving the stream of data can be configured to decompress and/or decrypt the data stream. The use of encryption and/or compression can reduce the amount of data being transferred as well as make the data in transit more secure. According to an embodiment, various compression and/or encryption techniques can be implemented by data conversion module 225.

According to an embodiment, the streaming server 890 can be configured to compress and/or encrypt physical or logical blocks in the data stream, and the content hosting server 895 can be configured to decompress and/or decrypt the data stream. These techniques can reduce the amount of data being transferred as well as make the data in transit more secure. According to an embodiment, various compression and/or encryption techniques can be implemented by streaming server 890.

Update management module 230 can be configured to receive a request to stream updated information to a particular client database from the user interface module 205. The update management module 230 can access the client information datastore 117 to determine whether the client is eligible to receive updates for the selected database. The update management module 230 can also verify the current version of the database that the client current has installed on the client datastore 125 based on a high water mark revision number associated with the version of the database on the client datastore 125. In an embodiment, the client datastore 125 can verify which version of the database the client has installed on the client datastore 125 using the version management module 235.

According to an embodiment, the user interface module 205 can prompt the client to enter a high water mark revision number that uniquely represents the current version of the database that the client has installed at their client datastore 125. As described above, the high water mark revision number is a unique version number that is associated with a specific version of a source database that has been created by the database content provider. The high water mark can be mapped to the set of data and/or database structure that was included in that version of the database and can be used to recreate that version of the database and to determine what changes would be needed to a database to update the database to a more current version of the database.

According to an embodiment, update management module 230 can also be configured to provide for scheduled streaming of updates to a client hosting server 120. Some client licensing agreements may require that the client be provided with regularly schedule updates to the database content by the database content provider. For example, some clients may require daily, weekly, monthly, quarterly, or other regularly scheduled updates. The update management module 230 can be configured to maintain a calendar of scheduled downloads for a plurality of clients and to automatically initiate the streaming of the updates to clients at scheduled intervals.

Version management module 235 can be configured to keep track of which clients have which versions of the various databases provided by the database provider. The version management module 235 can be configured to store high water mark information in the client datastore 117 for each client. In an alternative embodiment, the user interface module 205 can be configured to prompt a client to enter the high water mark revision number for the database that the client would like to upgrade.

According to an embodiment, the high water mark revision number for a database can be stored in the database, and a client can determine which version of the database is currently installed at their client datastore 125 by querying the database. When an upgrade is performed on the client's database, the high water mark revision number can be updated automatically to reflect the current version of the database.

Version management module 235 can be configured to compare the high water mark revision number provided by the client to a current high water mark revision number for the selected database to see if an update is available. If an update is available, the version management module 235 can notify the download management module 230 to transmit updates to the database to the content hosting server 120 across the network 130.

According to an embodiment, the version management module 235 can be configured to access the client information datastore 117 to determine whether the client is eligible to receive an update to the selected database. In some embodiments, a database developer can sell subscription services where clients are eligible for updates to the database content for a predetermine period of time. In other embodiments, the database developer can offer updates to the database to all registered customers who have purchased the database.

According to an embodiment, the version management module 235 can be configured to update the client information datastore 117 with the current high water mark revision number for a client after the client performs an upgrade to their database.

Figure 7:
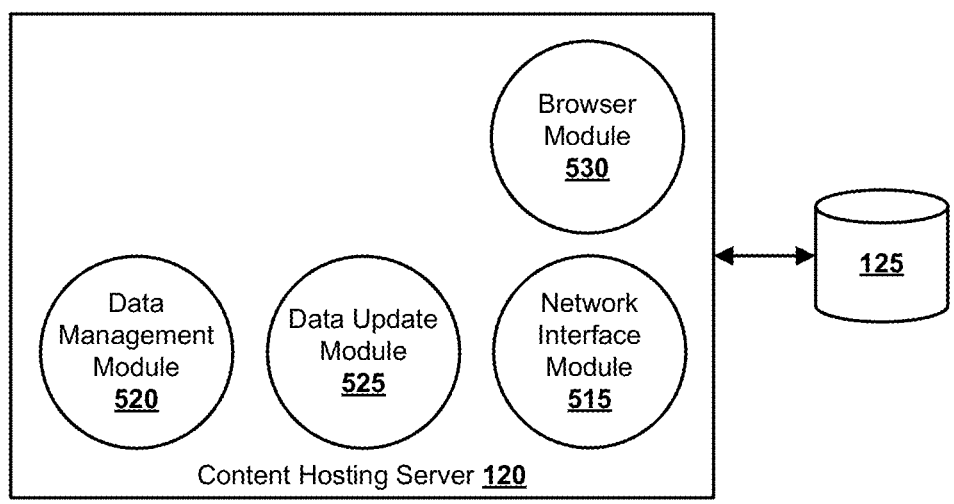
FIG. 7 is a block diagram illustrating selected functional elements of a content hosting server according to an embodiment.

FIG. 7 is a block diagram illustrating selected functional elements of a content hosting server illustrated in FIG. 3 (e.g., content hosting server 120a or 120b) according to an embodiment. The content hosting server includes data management module 520, data update module 525, network interface module 515, and browser module 530.

Network interface module 515 is configured to send and/or receive data across network 130. The network interface module 515 can receive data from the source content server 110 and forward the information to the appropriate module of the content hosting server 120 for processing. The network interface module 515 can be configured to format the data received from the network 130 into a format that is expected by a module of content hosting server 120 that is to receive the data. In an embodiment, network interface module 515 can be configured to format data received from other modules of the content hosting server 120 for transmission across the network 130.

Data management module 520 can be configured to provide an interface to content hosting server 120 for retrieving data from and storing data to client datastore 125. The data management module 520 can receive requests to access data from or store data to client datastore 125 or other datastores from the other modules of content hosting server 120. The data management module 520 can format the requests into a format that can be understood by the databases or datastores. For example, if client datastore 125 is a relational database, data management module 520 can convert a request received from a module of content hosting server 120 to a query, such as a SQL query. The data management module 520 can also receive data from the datastore 125 or other datastore and convert the data to a format expected by the module requesting the data.

Data update module 525 can be configured to receive a data stream comprising database updates from the source content server 110 via the network 130, to extract data from the data stream, to generate database commands based on the data extracted from the data stream, and to execute the database commands to update the contents of the client datastore 125 in order to synchronize the contents of the client datastore 125 with contents of the source datastore 115 of the source content server 110. According to an embodiment, the data update module 525 can be configured to receive a data stream comprising XML data representing database entries from the source database and actions to be taken on those database entries from the source content server 110. According to an embodiment, the data update module 525 can be configured to generate SQL commands based on the data extracted from the XML data and to execute those commands to update the contents of the client datastore 125. The data update module can also be configured to send a confirmation message to the database server if the local database has been updated successfully using the data extracted from the data stream. According to an embodiment, the confirmation message can include a new high water mark revision number associated with the contents of the local database.

According to an embodiment, data conversion module 225 of the source content server 110 can be configured to compress and/or encrypt physical or logical blocks in the data stream, and the data update module 525 of content hosting server 120 can be configured to decompress and/or decrypt the data stream received from the source content server 110. The use of encryption and/or compression can reduce the amount of data being transferred as well as make the data in transit more secure. According to an embodiment, various compression and/or encryption techniques can be implemented by data conversion module 225 of the source content server and the content hosting server 120.

Browser module 530 is configured to allow a user to browse network content, such as web pages. Browser module 530 can be configured to allow a user to enter a Uniform Resource Locator (URL) for a website that is maintained by the source content server 110. In an embodiment, the URL can be for a start page that allows the user to log into the database synchronization system in order to receive database updates. According to an embodiment, the browser module 530 can be used to send a request to the source content server 110 for an update to client datastore 125.

Figure 5:
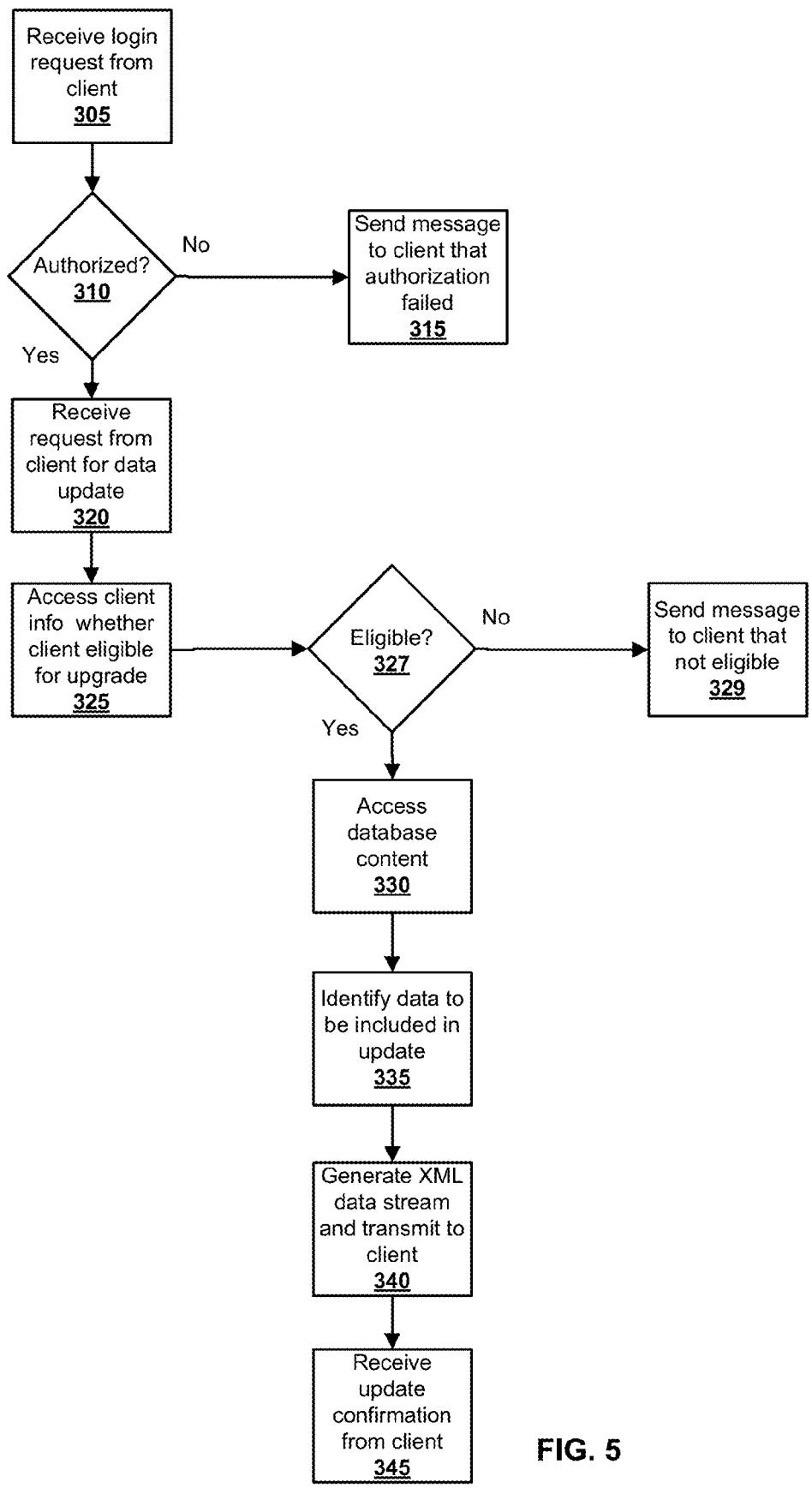
FIG. 5 is a flow diagram of a process for streaming database updates to a client according to an embodiment.

FIG. 5 is a flow diagram of a process for streaming database updates to a client according to an embodiment. According to an embodiment, the method illustrated in FIG. 5 can be implemented by server 110 illustrated in FIG. 3.

A login request can be received at the source content server 110 from a content hosting server 120 (step 305). According to an embodiment, the user interface module 205 of the source content server 110 can be configured to provide a user interface, such as a web page, which allows a client user to provide login credentials, such as a username and password, in order to gain access to the system. In one embodiment, a user at the content hosting server 120 can enter a Uniform Resource Locator (URL) for a website that is maintained by the source content server 110.

A determination is made whether the client is authorized to access the system based on the login credential provided (step 310). According to an embodiment, the user interface module 205 can provide the login credentials provided by a user to the authentication module 210 for authentication. Authentication module 210 can compare the login credentials to client information stored in the client information datastore 117 to determine whether the login credentials match that of a registered client. If login credentials provided by user match those in the client information datastore 117, the user is authorized to access the system.

If the user is not authorized to access the system, a message can be sent to the content hosting server 120 that indicates that authorization failed and the update cannot be performed (step 315). According to an embodiment, the user interface module 205 can display a message to the user on a web page. For example, the user interface module 205 can be configured to generate a client login webpage where a user at a content hosting server 120 can log into the system. If authentication fails, the user interface module 205 can update the login interface to display an error message indicating that the user did not provide a valid set of login credentials, and in some embodiments, the authentication module 205 may prompt the user to reenter the login credentials.

Otherwise, if the user is authorized to access the system, the method continues with step 320, where a request is received at the source content server 110 from the user of the content hosting server 120 for an update of a database version stored on the client datastore 125. According to an embodiment, the user can be presented with a "dashboard" interface that includes a listing of each of the databases that the client has purchased from the database provider. This listing can identify which version of the database is installed on the client datastore 125. The listing can also include an update-eligible indicator that indicates whether the user is eligible to receive updates for their copy of each database. In some embodiments, the purchase of a copy of some databases may include database updates for a database, while the purchase of other databases may not include database updates. For those databases that include updates, the number of updates may be limited or updates may only be available for a limited period of time. For example, a client may be eligible for updates for a particular database for 1 year after purchasing a copy of the database from the database provider.

The source content server 110 can receive a request from the content hosting server 120 for an update to a selected database (step 320). In an embodiment, the user interface module 205 can receive the request for an update via the dashboard interface or other user interface. The user interface module 205 can pass the request to the update management module 230 and the version management module 235, and the version management module 235 can be configured to extract which database and which version of the database the client is currently using from the request, access the source database 115 to determine the current version of that database that is available on the source datastore 115. The update management module 230 can also access the client information datastore 117 to determine whether the client is eligible to receive an update for the selected database (step 325). The update management module 230 can then make a determination whether the client is authorized to receive an update for that database based on the information retrieved by the version management module 235 (step 327).

According to an embodiment, the user interface module 205 can prompt the client to enter a high water mark number that represents the current version of the database that the client has installed at their client datastore 125. The high water mark comprises a unique version number that is associated with a specific version of a source database that has been created by the database provider. The high water mark can be mapped to the set of data and/or database structure that was included in that version of the database and can be used to recreate that version of the database and to determine what changes would be needed to a database to update the database to a more current version of the database.

In an alternative embodiment, the version management module 235 can be configured to keep track of which version of a database a client has installed in the client datastore 125. The version management module 235 can store a high water mark revision number for each database that a client has downloaded in the client information datastore 117. When a client requests an upgrade to a database, the version management module 235 can access the client information datastore 117 to determine whether the high water mark information is available for that database. If the information is not available, the version management module 235 can be configured to instruct the user interface module 205 to prompt the user to enter the high water mark information for the selected database. In an embodiment, the user interface module 205 can be configured to display instructions to the user on how the user can access the high water mark information for a database where the high water mark information is not already displayed as part of the dashboard interface.

In an alternative embodiment, the authorization steps 325 and 327 can be performed before the version management module 235 determines whether an update is available. In an alternative embodiment, the user interface module 205 can be configured to notify the version management module 235 when a client logs into the system, and the version management module 235 can access the client information datastore 117 to determine which versions of databases are currently installed on the client's datastore 125, access the source database 115 to obtain the version information for those databases, and make a determination whether any of the client databases are currently out of date.

If the client is not eligible to receive an upgrade requested, a message can be sent to the content hosting server 120 that indicates that authorization failed and the update cannot be performed (step 329). According to an embodiment, the user interface module 205 can display a message to the user on a web page. For example, the user interface module 205 can be configured to display an error message on the "dashboard" interface that indicates that the user is not authorized to receive an update for the selected database.

If the client is eligible to receive an upgrade requested, the update management module 230 can request that the data management module 220 access the source datastore 115 (step 330) and identify the information to be included with the upgrade (step 335). According to an embodiment, a history of the changes that have been made in each version of a database can be stored in the source datastore 115, and each version can be associated with a unique high water mark revision number. By comparing the high water mark revision number provided by the client or stored in the client information datastore 117, the data management module 220 can determine which information has changed since the version of the database that the client current has installed was generated. As described above, these changes can include both positive and negative content, where positive content includes data added to fields of a record or new records being added to the database, while negative content represents data that has been deleted from the database.

According to an embodiment, a database delta can be created that comprises a set of full record updates that have been made to the source database since the version of the database that the client currently has installed was generated. According to an embodiment, each record included in the delta can include an updated high water mark number that corresponds to the version of the data being downloaded to the client's database and a persistent identifier (a PID) that uniquely identifies the record, and a processing code. The processing code indicates what action should be performed on a particular record.

In an embodiment, the processing code can be one of three processing codes: (1) add, (2) change, or (3) delete. The "add" processing code indicates that the record is a new record that has been added to the source database since the last update of the client's database. Records with the "add" processing code will be inserted into the client's database. The new records are each associated with a unique PID that can be use later to reconcile any updates or deletions made to those records in the source database to the records included in the client's version of the database. Records having the "change" processing code existed in the version of database that the client currently has installed, but data included in the record has changed since the version of the database that the client currently has installed was created and the corresponding record in the client's database should be updated with current data stored in that record. For example, in a relational database, an entry can correspond to a row in a table, and data in one or more of the columns of the table has been added, deleted, or modified in the source database since the version of the database currently installed in the client datastore 125 was generated. An existing record can be identified using the unique PID associated with that record. The PID associated with a database entry remains the same even if the data included in the records is modified. This allows the PID to be used to identify which records have been added, modified, or deleted in each version of the source database. The "delete" processing code indicates that a record has been deleted from the source database and should be deleted from the client's database during the upgrade.

Data conversion module 225 can then convert the selected records into an XML data stream and transmit the stream of XML data to the content hosting server 120 via the network interface module 215 over the network 130 to the content hosting server 120 (step 340). According to an embodiment, the XML data can be streamed to the client in real time as the data conversion module 225 generates the stream of data. According to an embodiment, the data conversion module 225 can receive throughput information regarding the connection to the content hosting server 120 over the network 130 which can be used to regulate the rate at which the data conversion module 225 streams the data to the content hosting server 120. If the throughput of the connection decreases or increases, the data conversion module 225 can adjust the rate at which the XML data is streamed to the content hosting server 120. According to an embodiment, the streamed XML data records only contain attributes from the source datastore 115 and types of records that are defined in a licensee agreement associated with the client. A licensee agreement can indicate that a client have access to all or a subset of the contents of a particular database. The licensee agreement can be stored in the client information datastore 117. A client may have different licensee agreements for different databases. If a client has access to less than the entire database, the data conversion module 225 can be configured to include only those records that are to be accessible to the client in the stream of XML data transmitted to the client. For example, a client might not have access to certain columns of a table, to certain tables of a database, or to certain records included in a database, and the data conversion module 225 can be configured to exclude that data from the XML data stream.

According to an embodiment, data conversion module 225 can be configured to compress and/or encrypt physical or logical blocks in the data stream, and the content hosting server receiving the stream of data can be configured to decompress and/or decrypt the data stream. The use of encryption and/or compression can reduce the amount of data being transferred as well as make the data in transit more secure. According to an embodiment, various compression and/or encryption techniques can be implemented by data conversion module 225.

According to some embodiments, the source content server 110 can receive an update confirmation from the content hosting server 120 that indicates that the content hosting server 120 received the stream of XML data from the source content server 110 and was able to successfully update the client's database in the client datastore 125 (step 345). In some embodiments, the version management module 225 can be configured to receive the confirmation message from the content hosting server 120 when the update to the content hosting server 120 is completed. The confirmation message can include the new high water mark revision number associated with the version of the database installed in the client datastore 125. In an embodiment, the version management module 235 can be configured to update the client information datastore 117 with the new high water mark information included in the confirmation message.

Figure 6:
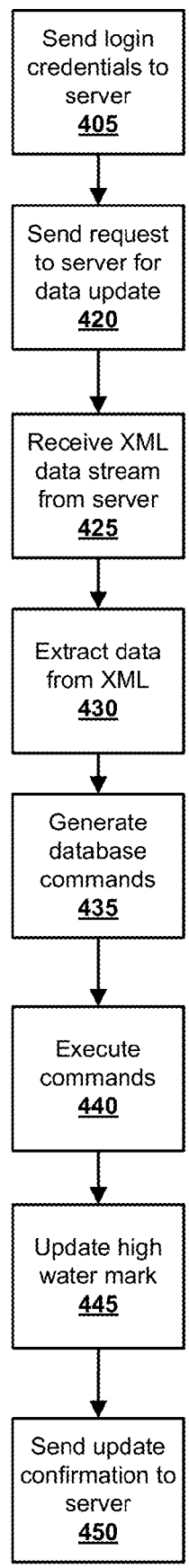
FIG. 6 is a flow diagram of a process for receiving streaming database updates from a database server and updating a database using the streamed data according to an embodiment.

FIG. 6 is a flow diagram of a process for receiving streaming database updates from a database server and updating a database using the streamed data according to an embodiment. According to an embodiment, the method illustrated in FIG. 6 can be implemented by the content hosting server 120 illustrated in FIG. 3.

A user at the content hosting server 120 can log into the system by providing login credentials to the source content server 110 (step 405). According to an embodiment, the user can access the system via a common Internet port, such as port 80 (HTTP) or port 83 (HTTPS). For example, the user can enter login credentials via a login screen displayed in a browser program being executed on the content hosting server 120. According to an embodiment, the user can access the system by entering a uniform resource locator (URL) of a login web page. As described above, the user can also provide other information, such as a service id associated with the client by the database content provider and/or a license id assigned by the database content provider identifies a database licensed to the client and for which the client would like to request an update.

Once the user has logged into the system, the client can send a request to the source content server 110 for an update to a database (step 420). As described above, the user interface module 205 of the source content server 110 can provide the user with a dashboard interface that can be displayed to the user once the user has logged into the system. This dashboard interface can provide the user with a list of databases that the user has purchased a copy of from the database provider. The user interface can be configured to allow a user to select a database from the list and send a request to the source content server 110 for an update to the selected database.

The content hosting server 120 can then receive a stream of XML data from the source content server 110 via the network 130 if the client's database is out of date (step 425). If the client's database is up to date, the source content server 110 can send a message to the content hosting server 120 that the version of the database that the client has installed in the client data store 125 is up to date. If the client is not authorized to receive an update for the selected database, the source content server 110 can send a message to the content hosting server 120 that the client is not authorized to receive an update for the selected database. According to an embodiment, the content hosting server can display messages received from the source content server 110 on a web page in a browser application being executed by the content hosting server 120.

According to an embodiment, data conversion module 225 of the source content server 110 can be configured to compress and/or encrypt physical or logical blocks in the data stream, and the content hosting server 120 can be configured to decompress and/or decrypt the data stream. The use of encryption and/or compression can reduce the amount of data being transferred as well as make the data in transit more secure. According to an embodiment, various compression and/or encryption techniques can be implemented by data conversion module 225 and the content hosting server 120.

The content hosting server 110 can then extract data from the XML data stream (step 430) and generate a set of database commands to update the database stored in the client datastore 125 with the data from the updated version of the database data received from the source content server 110 via the network 130 (step 435). For example, if the database is a relational database, the XML data stream can be converted into structured query language (SQL) commands that can be executed by a relational database management system to update the contents of the selected database in the client datastore 125. In other embodiments, other types of database can be used and database commands associated with those particular types of database can be generated.

Content hosting server 120 can execute the database commands (step 440) in order to update the copy of the database in the client datastore 125. Once the database has been updated, the content hosting server 120 can optionally update high water mark information associated with the database (step 445). For example, the content hosting server 120 may maintain a database of database related information for each of the databases that the client has installed and this information can be updated with the new high water mark associated with the updated version of the content hosting server 120. In some embodiments, the high water mark revision number information for a database may be stored in an entry in the database itself, and the content hosting server 120 can determine the version of a database by querying the database for this information. According to an embodiment, the XML data provided by the source content server 110 can include an entry that updates the high water mark information, which results in the content hosting server 120 generating a database command that updates the high water mark with a new high water mark revision number when the database is updated.

According to some embodiments, the content hosting server 120 can optionally send a confirmation message to the server that the upgrade to the database has been completed successfully (step 450). In an embodiment, the confirmation message can include the new high water mark revision number associated with the database that was updated.

Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer-implemented method for synchronizing the contents of a remote database with a source database, wherein one or more processors are programmed to perform the steps comprising:

maintaining a source database comprising a plurality of records, wherein each of the plurality of records comprises one or more fields, wherein each of the one or more fields is associated with a version identifier, wherein each of the plurality of records is associated with a version identifier corresponding to a highest version identifier of any of its one or more fields, and wherein the source database is associated with a version identifier corresponding to a highest version identifier of any of the plurality of records;

receiving a request from a content hosting server for an update to a remote database associated with the content hosting server;

identifying a database version associated with the remote database;

comparing the identified database version to a plurality of version identifiers associated with the plurality of records or fields in the source database;

identifying one or more data entries from the source database to be included in a database update based on the comparison;

generating a data stream that includes the identified one or more data entries by converting the identified one or more data entries to Extensible Markup Language (XML) data, and generating a data stream comprising the XML data; and transmitting the data stream to the content hosting server.

2. The method of claim 1, further comprising:
receiving login credentials associated with a client;
authenticating the login credentials;
determining whether the client is eligible to receive an update for the remote database; and
performing the steps of comparing, identifying one or more data entries, generating the data stream, and transmitting the data stream only if it is determined that the client is eligible to receive an update for the remote database.

3. The method of claim 1, wherein each of the one or more data entries included in the data stream comprises a persistent identifier (PID) that uniquely identifies the data entry and a processing code that identifies an action to be performed with the data entry when updating the remote database.

4. The method of claim 1, wherein the content hosting server is configured to receive the data stream, convert the data stream to database update commands, and execute the database update commands to update the contents of the remote database.

5. The method of claim 1, further comprising receiving a confirmation message from the content hosting server indicating that the remote database has been updated successfully, wherein the confirmation message includes a version identifier associated with the updated remote database.

6. The method of claim 1, wherein the steps of identifying one or more data entries, generating the data stream, and transmitting the data stream are only performed if contents of the remote database are out of date.

7. The method of claim 6, wherein the request from a content hosting server includes the database version associated with the remote database, wherein the contents of the remote database are out of date if the database version is less than the version identifier associated with the source database.

8. The method of claim 7, wherein identifying one or more data entries comprises identifying records or fields in the source database having a version identifier that is greater than the database version associated with the remote database.

9. The method of claim 7, wherein generating a data stream comprises compressing data included in the data stream.

10. The method of claim 7, wherein generating a data stream comprises encrypting data included in the data stream.

11. A technical system for synchronizing the contents of a remote database with a source database, the system comprising:

a non-transitory computer readable medium configured to store one or more executable programmed modules;
at least one processor communicatively coupled with the non-transitory computer readable medium and configured to execute the one or more executable programmed modules;
the one or more executable programmed modules that, when executed by the at least one processor,
maintain a source database comprising a plurality of records, wherein each of the plurality of records comprises one or more fields, wherein each of the one or more fields is associated with a version identifier, wherein each of the plurality of records is associated with a version identifier corresponding to a highest version identifier of any of its one or more fields, and wherein the source database is associated with a version identifier corresponding to a highest version identifier of any of the plurality of records;
receive a request from a content hosting server to update a remote database;
determine whether the content hosting server is eligible to receive an update to the remote database;
identify a database version of the remote database;
compare the identified database version to a plurality of version identifiers associated with the plurality of records or fields in the source database;
identify one or more data entries from the source database to be included in a database update based on the comparison;
generate a data stream that includes the identified one or more data entries by converting the identified one or more data entries to Extensible Markup Language (XML) data, and generating a data stream comprising the XML data; and send the data stream to the content hosting server.

12. The system of claim 11, wherein the one or more executable programmed modules further access data stored in the source database and a client information database and write data to the source database and the client information database.

13. The system of claim 11, wherein the one or more executable programmed modules further generate a user interface that is configured to allow users to interact with the system, collect data from users, and display data to users.

14. The system of claim 11, wherein the one or more executable programmed modules further:
receive login credentials associated with a client; and
authenticate the login credentials to determine whether the client is authorized to access content on the system.

15. The system of claim 11, wherein each of the one or more data entries included in the data stream includes a persistent identifier (PID) that uniquely identifies the data entry and a processing code that identifies an action to be performed with the data entry when updating the remote database.

16. The system of claim 11, wherein the one or more executable programmed modules further receive a confirmation message from the content hosting server indicating that the remote database has been updated successfully, wherein the confirmation message includes a version identifier associated with the updated remote database.

17. The system of claim 11, wherein the request from a content hosting server includes the database version associated with the remote database, wherein the contents of the remote database are out of date if the database version does not match the version identifier associated with the source database.

18. The system of claim 11, wherein identifying one or more data entries comprises identifying records or fields in the source database having a version identifier that is greater than the database version associated with the remote database.

19. The system of claim 11, wherein the one or more executable programmed modules further compress data included in the data stream before sending the data stream to the content hosting server.

20. The system of claim 11, wherein the one or more executable programmed modules further encrypt data included in the data stream before sending the data stream to the content hosting server.

* * * * *